United States Patent
Shih

(10) Patent No.: US 10,970,567 B2
(45) Date of Patent: Apr. 6, 2021

(54) METHOD AND SYSTEM FOR SYNTHESIZING A LANE IMAGE

(71) Applicant: iCatch Technology, Inc., Hsinchu (TW)

(72) Inventor: Chih-Chang Shih, Hsinchu (TW)

(73) Assignee: Catch Technology, Inc., Hsinchu (TW)

( * ) Notice: Subject to any disclaimer, the term of this patent is extended or adjusted under 35 U.S.C. 154(b) by 98 days.

(21) Appl. No.: 16/560,861

(22) Filed: Sep. 4, 2019

(65) Prior Publication Data

US 2019/0392227 A1    Dec. 26, 2019

Related U.S. Application Data

(63) Continuation of application No. 15/152,222, filed on May 11, 2016, now abandoned.

(51) Int. Cl.
| | |
|---|---|
| *G06K 9/00* | (2006.01) |
| *H04N 7/18* | (2006.01) |
| *H04N 5/262* | (2006.01) |
| *G08G 1/16* | (2006.01) |

(52) U.S. Cl.
CPC ....... *G06K 9/00798* (2013.01); *H04N 5/2625* (2013.01); *H04N 5/2627* (2013.01); *H04N 5/2628* (2013.01); *H04N 7/183* (2013.01); *B60R 2300/00* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 2009/0080697 A1* | 3/2009 | Kishikawa | ............. | G01C 15/00 382/103 |
| 2010/0266161 A1* | 10/2010 | Kmiecik | ............. | G01C 21/3822 382/103 |
| 2012/0212612 A1* | 8/2012 | Imai | ...................... | B60W 30/12 348/148 |
| 2013/0028473 A1* | 1/2013 | Hilldore | ............. | G06K 9/00798 382/103 |
| 2013/0293717 A1* | 11/2013 | Zhang | ................ | G06K 9/00798 348/149 |
| 2014/0300743 A1* | 10/2014 | Kumon | .................... | G06T 11/00 348/148 |
| 2015/0086080 A1* | 3/2015 | Stein | ...................... | H04N 7/183 382/104 |

(Continued)

OTHER PUBLICATIONS

Wirth, Michael A., Ph.D., "Image Processing II," Computing and Information Science, Image Processing Group, 2004, pp. 1-59.

*Primary Examiner* — Michael J Hess
(74) *Attorney, Agent, or Firm* — Haynes and Boone, LLP

(57) ABSTRACT

A method for synthesizing a lane image is proposed in the present application. This method includes the following steps. M continuous image frames are retrieved at a frame rate f from a video image capture device. A quantity N for image mapping is determined based on a dash length L of a dashed line and a distance S between two dashes of the dashed lines. A frame interval for mapping image frames is determined based on the dash length L, the distance S, the velocity v, and the frame rate f. At least N image frames are retrieved from the M continuous image frames at the frame interval. The at least N image frames are synthesized to obtain the lane image using an image synthesizing device.

20 Claims, 13 Drawing Sheets

(56) References Cited

U.S. PATENT DOCUMENTS

| | | | |
|---|---|---|---|
| 2015/0302257 A1* | 10/2015 | Takemura | G06T 7/20 |
| | | | 382/104 |
| 2015/0354976 A1* | 12/2015 | Ferencz | G06K 9/3241 |
| | | | 382/104 |
| 2016/0050356 A1* | 2/2016 | Nalepka | G06K 9/00791 |
| | | | 348/148 |
| 2016/0307054 A1* | 10/2016 | Takemura | H04N 5/2171 |
| 2016/0311428 A1* | 10/2016 | Kizumi | G01C 21/26 |

* cited by examiner

METHOD AND SYSTEM FOR SYNTHESIZING A LANE IMAGE

CROSS-REFERENCE TO RELATED APPLICATIONS

The present application is a continuation of U.S. patent application Ser. No. 15/152,222, filed on May 11, 2016, the disclosure of which is incorporated herein by reference in its entirety.

FIELD OF THE INVENTION

The present invention is related to synthesizing a lane image and, more specifically, to deal with lane detection in a scenario of dashed lines of a lane.

BACKGROUND OF THE INVENTION

Traditionally, a Lane Departure Warning (LDW) System is a set of active safety-assistance-systems for a vehicle, in which a video image capture device shoots the scenes of roads and then detects the locations of the lane lines to determine whether the vehicle is shifting from the center of the lanes by a driver. Whenever the vehicle is judged to be shifting from the center of the lanes, the LDW system will pop up a warning message and suggest that the driver drive back to the center of the lanes.

But in most road scenes, there are often cases with dashed lines of the lane in an image. In addition, if the LDW system is installed on a driving record for the vehicle, its hood often blocks a part of the road in the image, and thus it makes the lane lines more narrowly rendered in a frame. In these cases, the distance of dashed lines would cause a poor success rate for lane detection.

However, many lane lines in the road are not completely straight lines or solid lines. Please refer to FIG. 1, which illustrates two frames 13 and 15 taken from a video image capture device 10 installed on a moving vehicle 11, which moves in an upward direction from the lower location P11 to the upper location P12 shown in this figure. When the moving vehicle 11 is located at the lower location P11, frame 13 is captured; and when the moving vehicle 11 is located at the upper location P12, the frame 15 is captured.

Please focus on the region of interest (ROI) within the rectangles surrounded by pairs of dashed lines shown in frames 13-16, which are all labeled with two dashed lines. In addition, frame 14 includes a portion the same as that in frame 13 of the shot; frame 16 includes a portion the same as that in frame 15 of the shot; and frames 13-16 together illustrate the LDW system applied in the scenario of distances between dashed lines of lanes 17-19. Obviously, it would be difficult to detect a lane line 19' in the ROI of frame 16 rather than detecting a lane line 17' in the ROI of frame 14.

Please refer to FIG. 2, which illustrates 12 frames (Frames 2A-2L) retrieved from a video image capture device in a given time under the condition that the 12 frames are captured with a frame rate of 30 frames per second (FPS) and the velocity of a vehicle is equal to 85 kilometers/hour (km/hr). It can be seen that there are spaces between the dashed lines shown in individual frames during the period. For example, white spaces lie between a solid line 21 and a dashed line 22 and the dashed line 22 and another solid line 23 in Frame 2A. Thus there is less than a 33% possibility to detect a well-defined lane among these frames (referring to Frames 2A, 2B, 2C and 2L out of the 12 frames).

By referring to the lane detection in the prior art, Kim et al. (US patent application No. 20120154588) disclose a method for detecting different kinds of lanes, say a solid line, a dashed line and the colors of the lane, and then determining whether to prompt a warning or not based on the lane type and its color. More specifically, the lane departure warning system includes an image sensing unit, an edge extracting unit, a lane recognizing unit, a lane type determining unit, a lane color detecting unit, a lane pattern generating unit, and a lane departure determining unit. The image sensing unit senses a plurality of images. The edge extracting unit emphasizes the edge components necessary for lane recognition. The lane recognizing unit detects straight line components. The lane type determining unit determines a type of the lane. The lane color detecting unit detects a color of the lane from an image signal value. The lane pattern generating unit generates a lane pattern. The lane departure determining unit determines lane departure in consideration of the type and the color of the lane and a state of a turn signal lamp.

Although Kim et al. can determine whether the lane line is a dashed line, it is only applied in the scenario of the lanes under a condition that the lane line feature occupies most of the area in the frame; that is to say, there need to be more than two dashed lines in the ROI.

Although one can still determine the kinds of the lane, the scope of lane lines may be too narrow in the image to detect more than two dashed lines under some settings, such as the LDW system being installed on the front part of the vehicle with the hood blocking the essential information on the road. This could cause a mis-judgment of the kind of the lane, or even fail to detect.

Masato Imai et al. (US patent application No. 20120212612) propose a lane departure warning apparatus capable of preventing false warnings and the absence of a warning regarding lane departure which is attributed to special road geometries such as junctions and tollgates. The lane departure warning apparatus for that outputs a warning signal when determining the departure of a vehicle from a lane, performing the steps of: when one dividing line in a vehicle width direction of the vehicle is non-detected, estimating a position of the one dividing line based on a position of the other dividing line as a first estimated dividing line; estimating a position of the non-detected dividing line based on a position of the one dividing line prior to non-detection as a second estimated dividing line; and comparing the first estimated dividing line with the second estimated dividing line to determine lane departure.

However, Masato Imai et al. should determine whether the estimated dividing line is correct before a next detection happens, and one can not judge any displacement between the intervals of the two detections. In addition, this algorithm will fail in cases where the two sides near the vehicle are both dashed. If there is noise in the distance of dashed lines, this would impact the assessment the estimated dividing line and the problem of dashed lines will not be solved. In addition, this technology cannot be used in the case of the driving record configured on the front part of the vehicle and it will increase the system's loading.

Kazuyuki Sakurai (U.S. Pat. No. 8,655,081) discloses a method to improve the problem of lane line detection, especially for dashed line detection. This method can improve the lane recognition accuracy by suppressing noises that are likely to be generated respectively in an original image and a bird's-eye image. The lane recognition system recognizes a lane based on an image. The system includes: a synthesized bird's-eye image creation module which creates a synthesized bird's-eye image by connecting a plurality of bird's-eye images that are obtained by transforming respective partial regions of original images picked up at a plurality of different times into bird's-eye images; a lane line candidate extraction module which detects a lane line candidate by using information of the original images or the bird's-eye images created from the original images, and the synthesized bird's-eye image; and a lane line position estimation module which estimates a lane line position based on information of the lane line candidate.

Kazuyuki Sakurai installs the system on the back part of the vehicle. However, this requires a more sophisticated theory, such as Bird's eye transformation algorithm. In addition, it also needs to detect two frames simultaneously to perform a lane detection and judgment, which also increases the system's loading.

SUMMARY OF THE INVENTION

The present invention is related to a method for synthesizing a lane image. The method includes steps of: retrieving M continuous image frames at a frame rate from a video image capture device; determining a quantity N for image mapping based on a dash length of a dashed line and a distance between two dashes of the dashed lines; determining a frame interval for mapping image frames based on the dash length, the distance, the velocity, and the frame rate; fetching at least N image frames from the M continuous image frames at the frame interval; and synthesizing the at least N image frames to obtain the lane image using an image synthesizing device.

In accordance with one aspect of the present invention, a method for real-time image synthesis from a video image capture device installed on a vehicle is disclosed. The method includes steps of: retrieving M continuous image frames at a frame rate from the video image capture device built on the vehicle; determining a frame interval for mapping image frames based on a dash length of a dashed line, a distance between two dashes of the dashed lines, a real-time velocity v of the vehicle and the frame rate; determining a quantity N for image mapping at least based on the dash length and the distance; fetching at least N image frames from the M continuous image frames at the frame interval; and synthesizing the at least N image frames to obtain a lane image by an image synthesizing device.

In accordance with one aspect of the present invention, a lane image synthesizing system for a vehicle is disclosed. The system includes a database, and an image mapping module. The database contains a plurality of images. The image mapping module is configured to: determine a quantity N for image mapping; determine an interval based on parameters including at least one of a velocity of the vehicle and a sampling rate of the plurality of images; fetch at least N images from the plurality of images according to the interval; and synthesize the at least N images into a lane image.

The above objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The invention is related to synthesizing images shot at different times based on a velocity of a vehicle and the regulations for lane lines to obtain an optimal image synthesizing condition as well as a stable lane detection.

Figure 1:
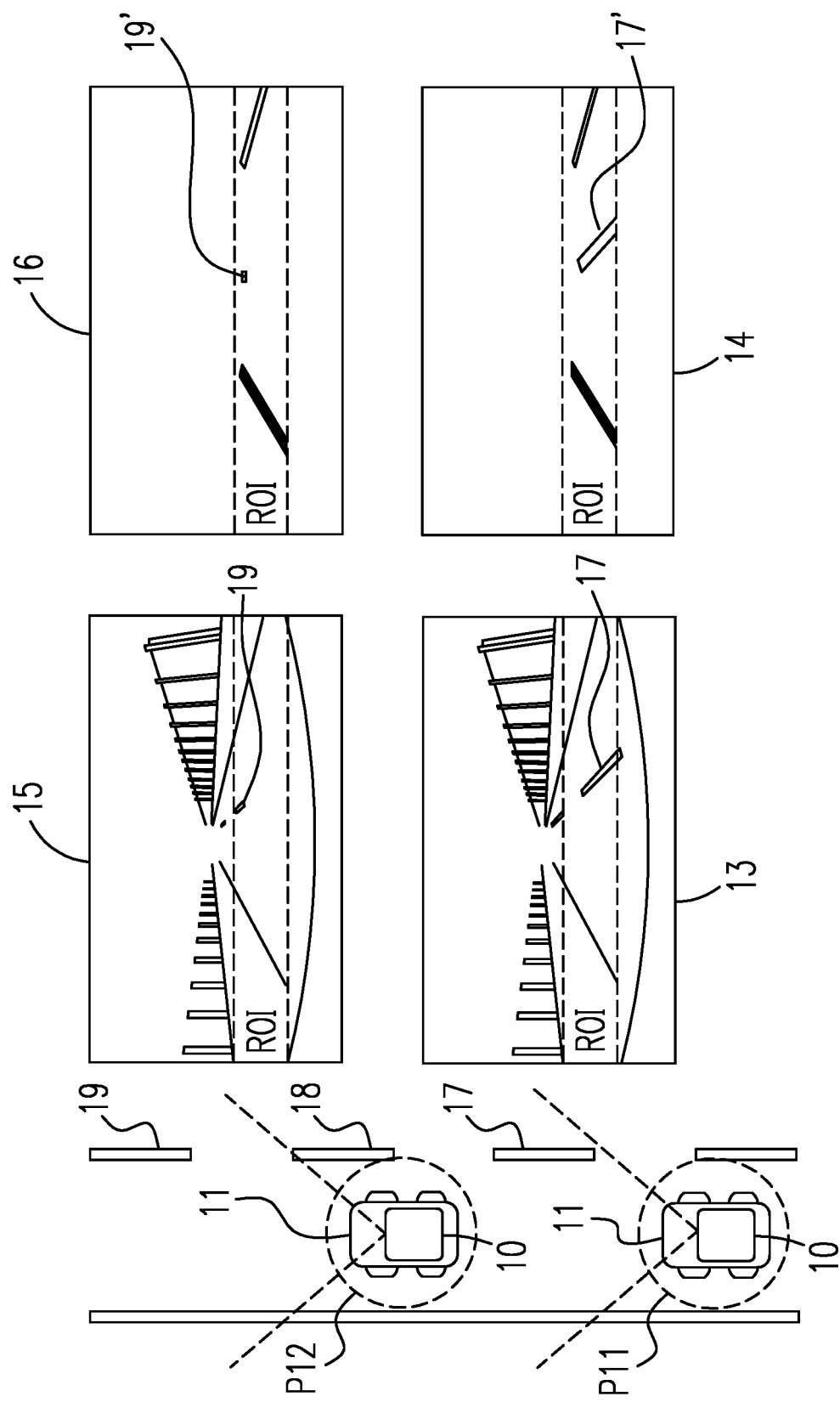
FIG. 1 illustrates two shots retrieved from a video image capture device and the results of lane detection.
Figure 2:
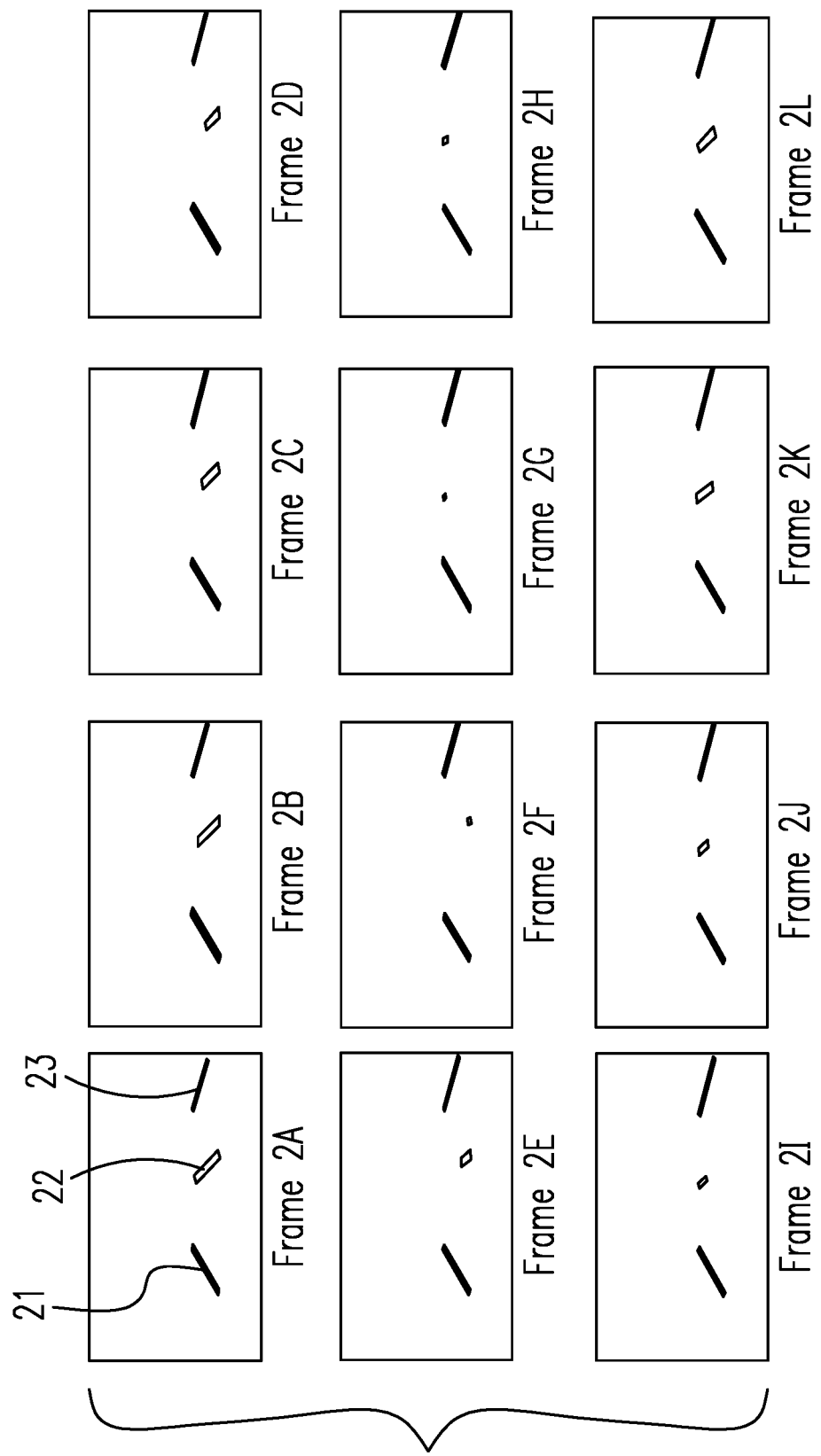
FIG. 2 illustrates 12 frames retrieved from a video image capture device under the condition of 30 frames per second and 85 kilometers/hour as a velocity of a vehicle.
Figure 3:
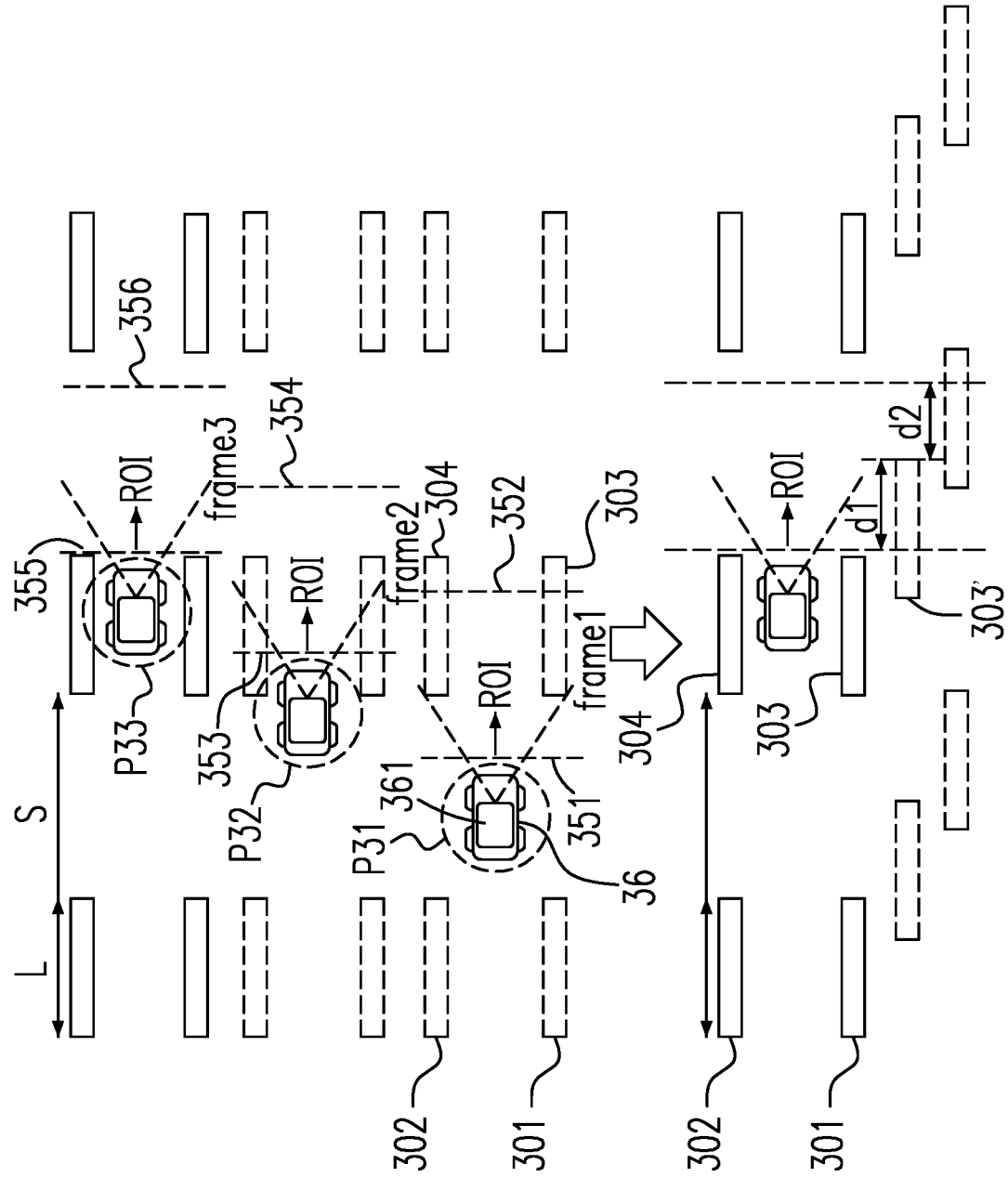
FIG. 3 illustrates a scheme for synthesizing a lane image with three frames retrieved from a video image capture device according to the embodiments of the present invention.

Please refer to FIG. 3, which illustrates a synthesizing scheme of the present invention by using an image processing method from the bird's-eye view. The method includes referring to a velocity of a vehicle 36 moving from left to right and locating at a left location P31, a middle location P32 and a right location P33. The velocity can be measured by a global positioning system (GPS). As one can observe from the figure, the vehicle 36 passes the lanes 301-304 and a video image capture device 361 built or installed on the front part of the vehicle shot 3 frames with 45 degrees of view in the ROI and a depth of field illustrated by vertically dashed lines 351-352, 353-354 and 355-356 in a time sequence. The scenes within the depth of field are shot by the video image capture device 361 built on the vehicle 36.

Variables d1 and d2 both demonstrate the differences of depths of field between frames 1-2 and frames 2-3 relative to the lane 301 shot in individual frames.

One could easily find that the video image capture device 361 built on the vehicle 36 at the location P31 shoots nearly two complete lanes 303-304 with 45 degrees of view in the ROI in a depth of field of frame 1, ranged between dashed lines 351-352. However as the vehicle 36 moves to the location P32, the video image capture device 361 can only shoot a portion of the lane 303 within 45 degrees of view in the ROI in a depth of field of frame 2, which is also illustrated by d1 of lane 303'.

The method further includes steps of: computing an interval and a quantity for mapping images by referring to a dash length L of a dashed line and a distance S between two dashes of the dashed lines; retrieving ROIs of previous images from a video image capture device, such as frame number 1-3 shot in the upper part of this figure; and composing a number of images into a lane image as shown in the lower part of the figure. With the composed lane image, the present invention effectively improves the success rate for later lane detection.

Figure 4:
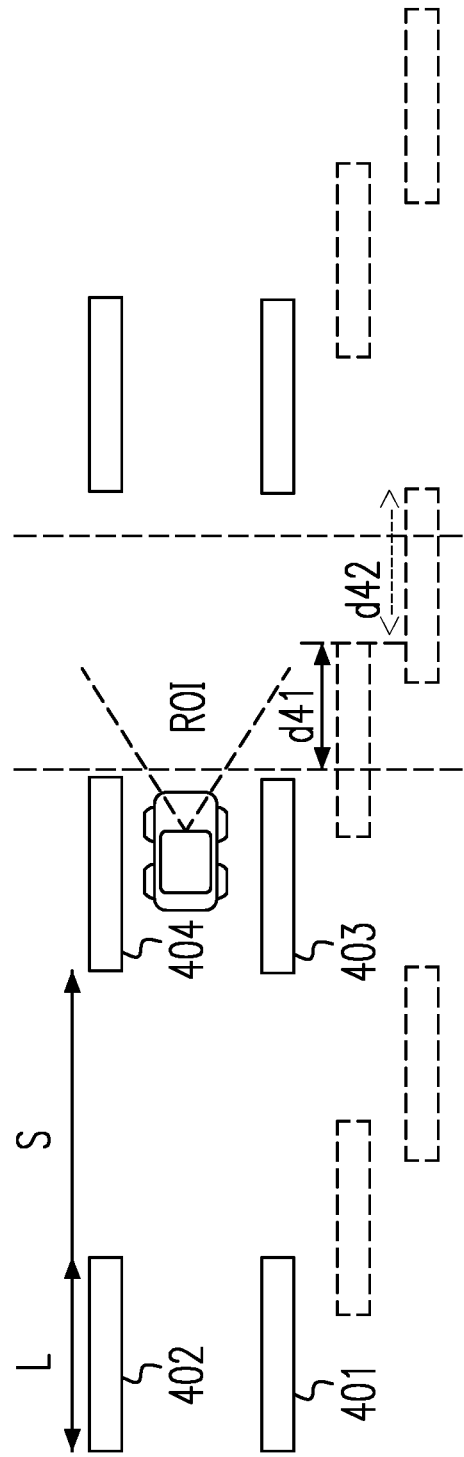
FIG. 4 illustrates a dash length of a dashed line, a distance between two dashes of the dashed lines according to regulations for lane lines, as well as a moving distance of a vehicle between two frames retrieved from a video image capture device.

Calculating a necessary count N for image mapping:

Please refer to FIG. 4. It illustrates a dash length L of a dashed line, a distance S between two dashes of the dashed lines according to the regulations for lane lines, as well as moving distances d41 and d42 of a vehicle by referring to lane 403 between every two frames retrieved from a video image capture device, wherein the vehicle is passing through lanes 401-404 from left to right. For example, L=4 meter, 5=6 meter based on regulations for lane lines in Taiwan, and L=3 meter, S=9 meter for the corresponding standard in the United States. By synthesizing ROIs of images at different positions on the time scale, one can fulfill the moving distance d between two dashes of the dashed lines in a current frame with a dash length of the dashed line in a prior frame. Therefore one can calculate a necessary count N to fulfill the distance S between two dashes of the dashed lines, such as in formula I:

$$N_{least} = \text{ceil}(S/L) + 1 \quad \text{(formula I)}$$

where ceil(x) is a function of x which maps the least integer that is greater than or equal to x, $N_{least}$ represents a least quantity for image mapping, L represents a dash length of a dashed line and S represents a distance between two dashes of the dashed lines, as well as the necessary count N shall be no less than the least quantity for image mapping $N_{least}$, such as in formula II:

$$N \geq N_{least} \quad \text{(formula II)}$$

Calculating a frame interval for mapping image frames:

In order to compose dashed lines cropped from the ROI of the frames into a straight line, a moving distance d of the vehicle between two frames should be within the following range between (S/(N−1)) and L as the formula III:

$$\frac{S}{(N-1)} \leq d \leq L \quad \text{(formula III)}$$

In addition, it is found that there is a relationship among the time t, the velocity v of the vehicle, the distance d between dashed lines of the lane, the frame interval m for mapping image frames and a frame rate (sampling rate) f for a number of continuous image frames, such as frame 1, frame 2, frame 3 . . . , as in formula IV:

$$t = \frac{d}{v} = \frac{m}{f} \quad \text{(formula IV)}$$

The formula IV can be further formatted as formula V:

$$m = \frac{f}{v} d \quad \text{(formula V)}$$

Because the frame interval for mapping image frames must be an integer, the functions of floor and ceiling of the frame interval m can be calculated as in the following inequality VI:

$$\text{ceil}\left(\frac{f}{v}\left(\frac{S}{N-1}\right)\right) \leq m \leq \text{floor}\left(\frac{f}{v}(L)\right) \quad \text{(inequality VI)}$$

where floor(x) is a function of x which maps the greatest integer that is less than or equal to x, $N_{least}$ is the minimal integer among all of the necessary count N for image mapping.

Please note that there may be a variety of combination as the necessary count N and the frame interval m both satisfy formula II and inequality VI. However for the sake of reduced noise in the further steps for image mapping, the necessary count N and the frame interval m with less values are preferred in the embodiments.

Figure 5:
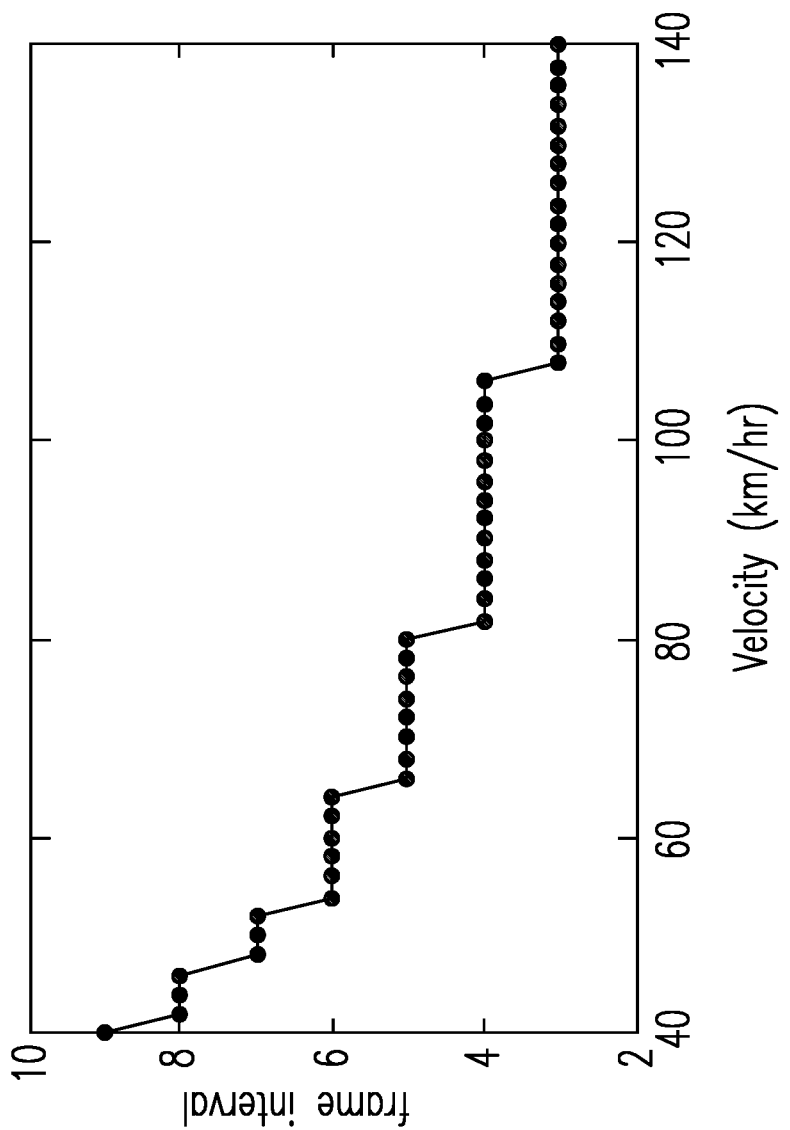
FIG. 5 illustrates a plot regarding a velocity of a vehicle and a frame interval for mapping frames.

Please refer to FIG. 5, which illustrates a plot regarding a relationship between a velocity of a vehicle and a frame interval for mapping frames. The frame interval can be calculated at least based on the individual velocity of the vehicle.

Lane Image Synthesis:

After the necessary count N and frame interval m for mapping image frames are calculated, at least N image frames retrieved from certain continuous image frames at the frame interval m are fetched. If each of the image frames belongs to a binary image, one should take the union of the at least N image frames to form the lane image. If each of the image frames belongs to a gray scale image or a color image, one should consider a Max function or an addition algorithm for said image frames to form the lane image.

Figure 6:
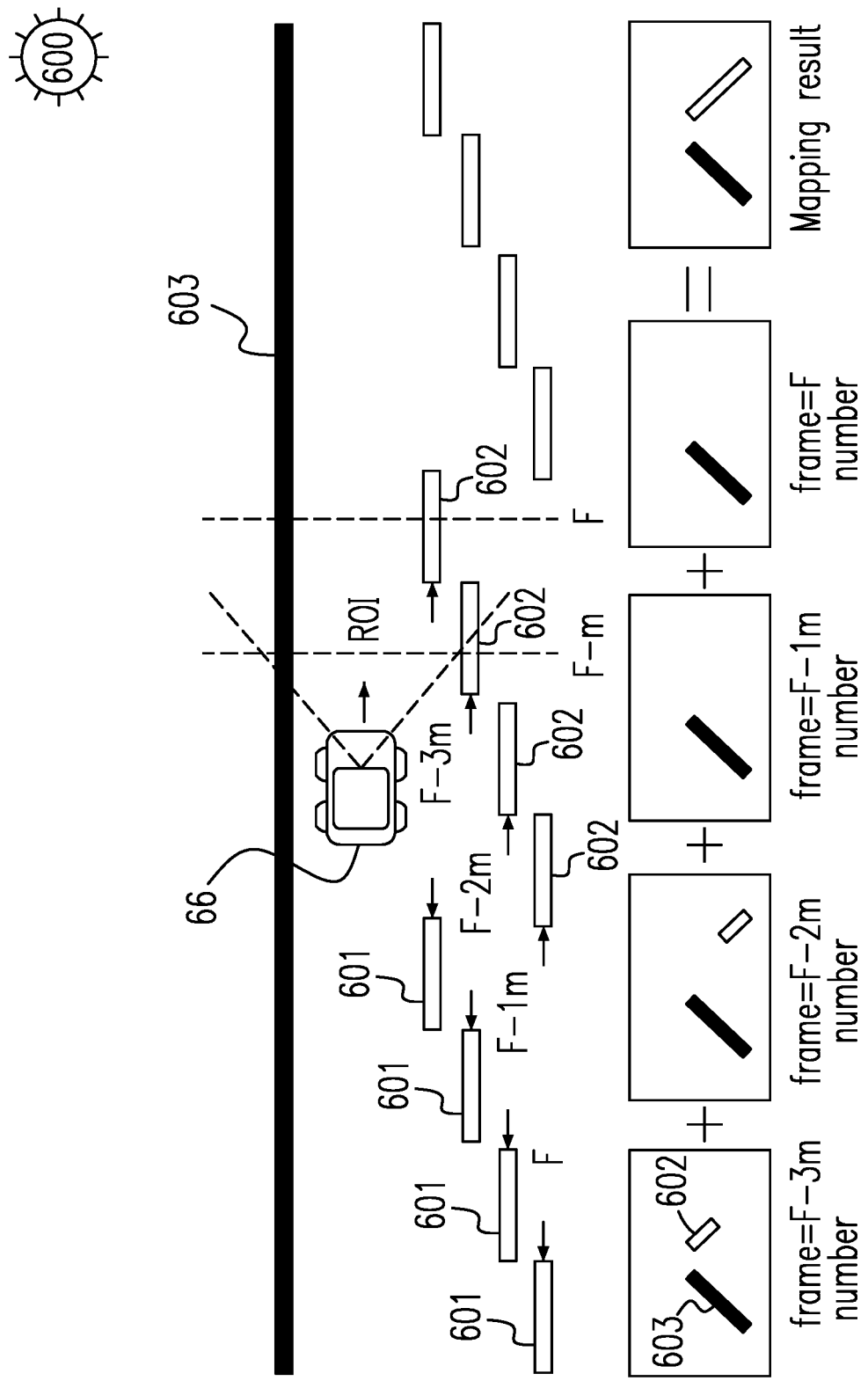
FIG. 6 illustrates a diagram of synthesizing a lane image with four frames to form a lane image according to the embodiments of the present invention.

Please refer to FIG. 6, which illustrates a diagram of synthesizing a lane image with four frames to form a lane image according to the embodiments of the present invention. A vehicle 66 is passing through lanes 601-603 from left to right, wherein the lane 603 belongs to a solid line and the lanes 601-602 are dashed lines. A video image capture device in the vehicle 66 shots frames within a depth of field defined by two vertically dashed lines. For example, the video image capture device shoots a complete lane 603 and a fragment of the lane 602 in a ROI of the depth of field of frame number equaling F.

Thus a lane image synthesizing system implemented with this invention would fetch at least N=4 images from the plurality of frames according to the frame interval m, say frame numbers as F, F-1m, F-2m and F-3m. The lanes 601-602 shot in the individual frames (frame number F, F-m, F-2m and F-3m) are all superimposed and rendered in this figure by referring to the relative position among the lanes 601-603, the vehicle 66 and a sun 600 in the sky.

Afterwards, the video image capture device synthesizes the at least N=4 images illustrated in the left four squares in the lower part of the figure. And then the fragments of lanes 602 and 603 shown in the left four squares are composed into a lane image shown in the right most square as a mapping result. The lane image is then processed with a lane detection and a lane departure detection to recognize the position of the lane.

More specifically, whenever the vehicle 66 deviates from one of the reference line and the lane, there will be a warning message pop-up for the driver.

Figure 7:
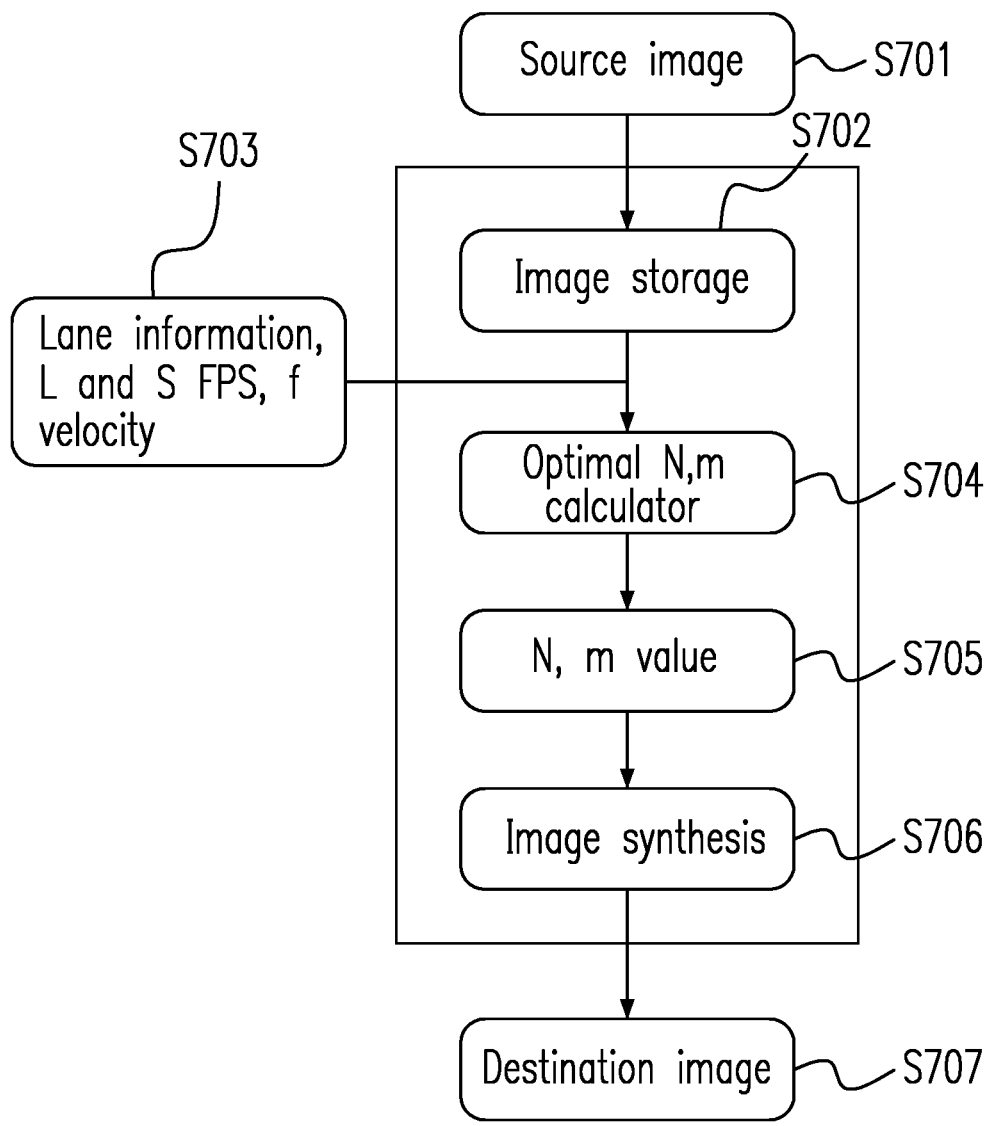
FIG. 7 illustrates a flowchart of a method for synthesizing a lane image according to the embodiments of the present invention.

Please refer to FIG. 7, which illustrates a flowchart of a method for synthesizing a lane image according to the embodiments of the present invention.

A video image capture device shoots the scenes of the road as a source image (step S701), and stores each image frame in a memory buffer (step S702), wherein each image frame has an image being selected from one of the group consisting of a binary image, a gray scale image and a color image depending on the type of video image capture device.

Afterwards, an optimal calculator for image mapping and another optimal calculator for a frame interval using in mapping image frames are applied to generate a quantity N for image mapping and a frame interval m for mapping image frames according to regulations for lane lines, a frame rate f and a real-time velocity v of a vehicle (step S703-S705).

Afterwards, at least N image frames are fetched from a number of image frames retrieved from the memory buffer; and the at least N image frames are used to obtain the lane image using an image synthesizing device (step S706). Whenever the source image belongs to a binary image, a further step of taking the union of the at least N image frames to form the lane image will be performed. In another example, if the source image belongs to a gray scale image or a color image, a Max function for said image frames to form the lane image would be chosen. In addition, other image operators could be used in said image frames with gray scale pixels, such as a Sobel filter.

The image synthesizing device can be built on an embedded system or any other portable information platform. These portable information platforms, such as mobile phones, PDAs, pagers, etc., are typically based on an embedded controller that integrates a microprocessor and a set of system and application programs in the same device. Presently, a virtual machine, such as Java Virtual Machine (JVM) or Microsoft Virtual Machine (MVM) is integrated to the embedded system as a cross-platform foundation for the running of application programs on the information platform.

In step S707, once the lane image is completed, an image processing or prompting can be conducted based on a well-defined lane image as a destination image.

Figure 8:
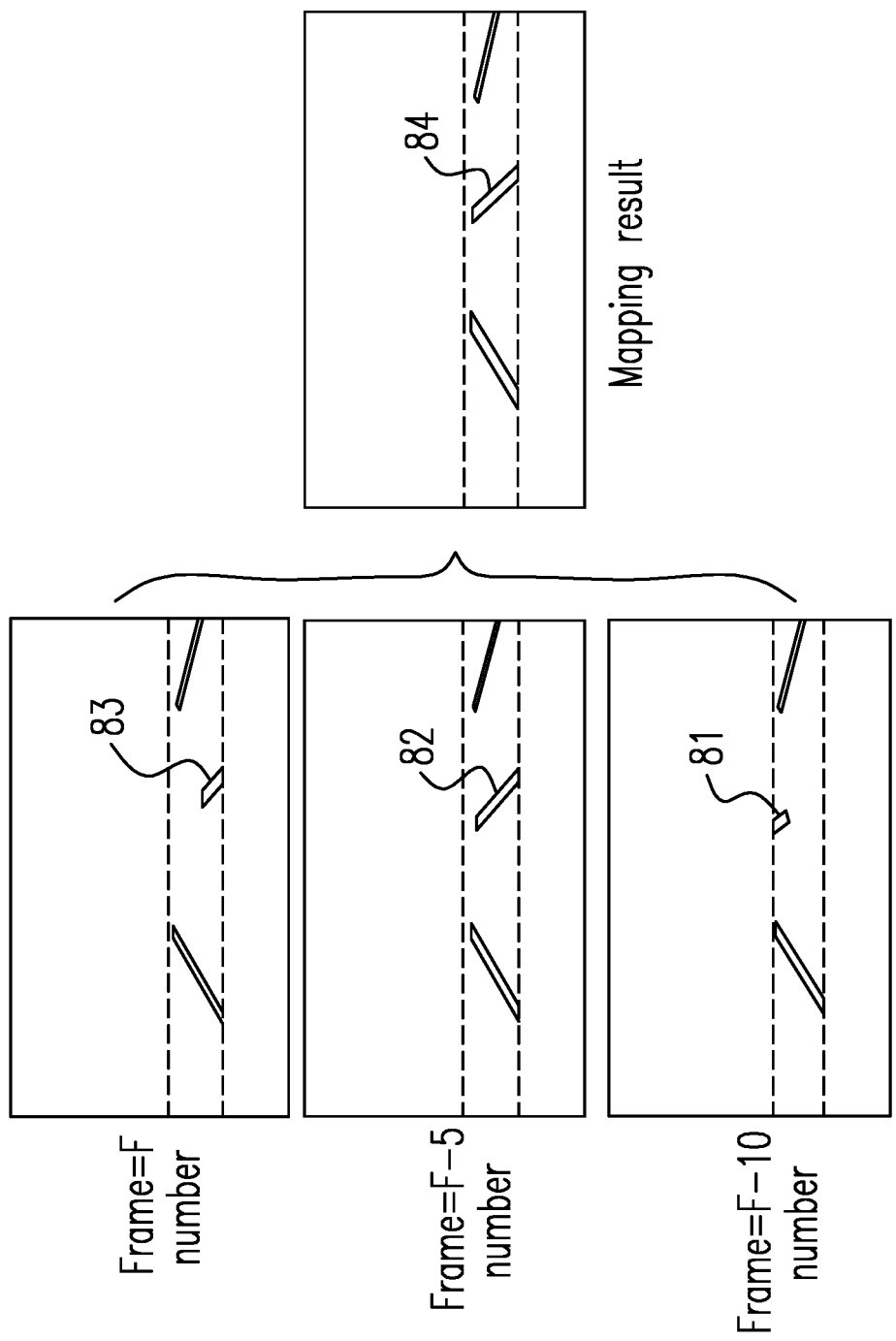
FIG. 8 illustrates a diagram of synthesizing a lane image with three binary frames to form a lane image, in which the frame interval for mapping frames equals 5.

Please refer to FIG. 8, which illustrates a diagram of synthesizing a lane image with three binary frames (frame number F, F-5, and F-10) to form a lane image as a mapping result, and the frame interval for mapping frames equals 5. It can be seen that fragments 81-83 of a lane can be combined into a complete lane 84 shown in this figure.

Figure 9:
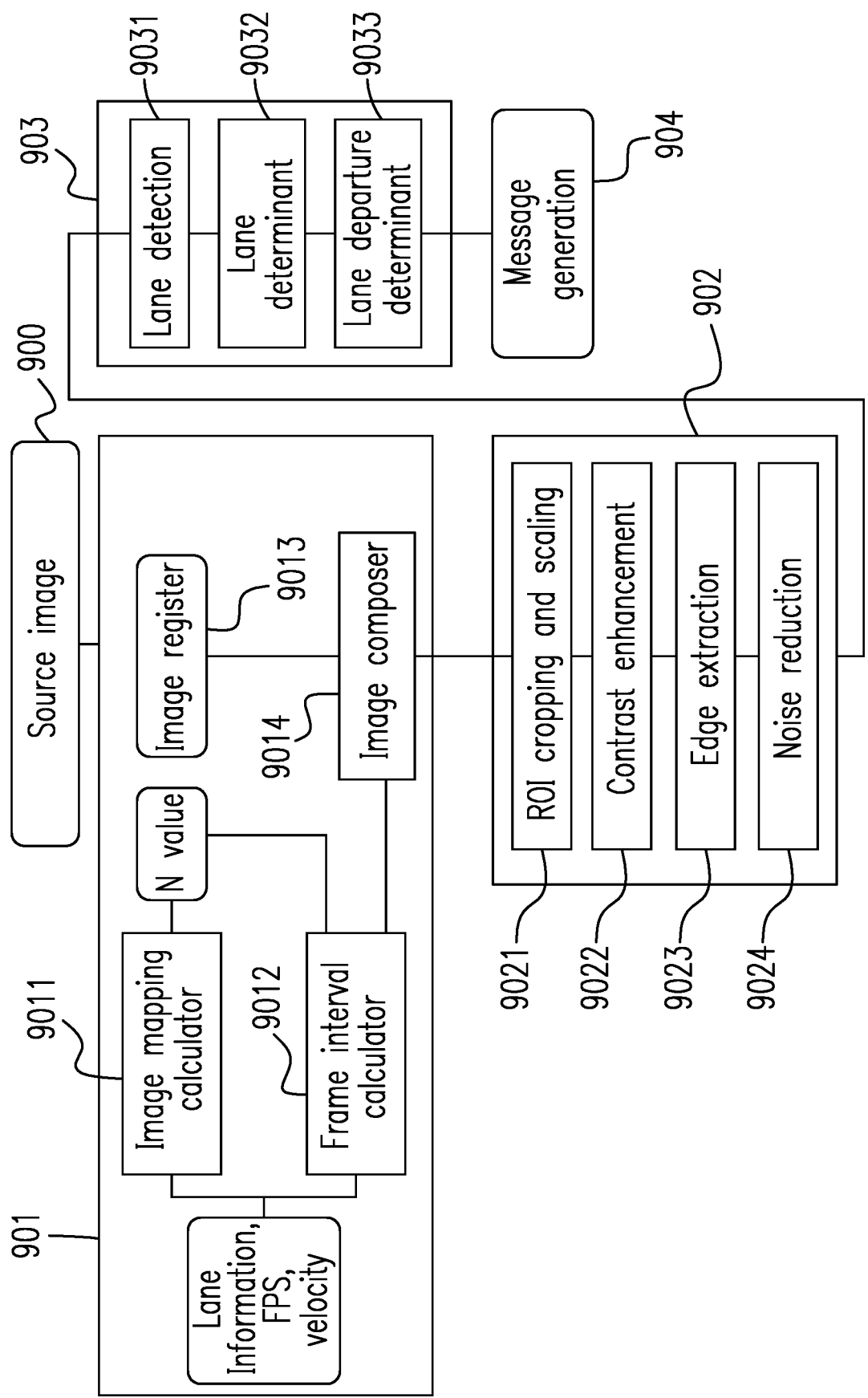
FIG. 9 illustrates a diagram of a lane image synthesizing system consisting of an image mapping module, an image processing module and a prompting module according to the embodiments of the present invention.

Please refer to FIG. 9, which illustrates a diagram of a lane image synthesizing system according to the embodiments of the present invention. The lane image synthesizing system includes an image mapping module 901, an image processing module 902, a prompting module 903 and a message generation module 904, wherein a lane image is formed before applying the image processing module 902 and the prompting module 903.

The idea of the image mapping module 901 is similar to the embodiment in FIG. 7, which can be viewed as another image synthesizing device used in step S706. The image mapping module 901 includes an image mapping calculator 9011, a frame interval calculator 9012, an image register 9013 and an image composer module 9014, and in this example, the image register 9013 is responsible for storing a plurality of images 900 from a video image capture device and the image register 9013 plays the role as an image database. A lane image can be composed by referring to the necessary count for image mapping, a frame interval and a specific velocity. This velocity v can be measured from a global positioning system, a radar speed measuring device (RSMD), a laser speed measuring device (LSMD), an Average Speed Calculator (ASC) or any other speed measuring device.

A necessary count for image mapping and a frame interval corresponding to a specific velocity of a vehicle are calculated via the image mapping calculator 9011 and the frame interval calculator 9012. Thus the image mapping calculator 9011 determines a least quantity $N_{least}$ for image mapping while the frame interval calculator 9012 determines a quantity N and the frame interval based on parameters including at least one of the velocity of the vehicle and a sampling rate of the plurality of images 900, said 30 frames per second among these continuous images. The image mapping module 901 can obtain a velocity value, a length value, a distance value and a sampling rate value. The velocity value, the length value, the distance value and the sampling rate value respectively represent the velocity v, the dash length L, and the distance S and the sampling rate (or a frame rate). For example, the frame interval is determined based on the velocity value, the length value, the distance value and the sampling rate value.

In this example, the plurality of images 900 could be stored in frames. However the plurality of images 900 could also be viewed as a stream and be stored in a multidimensional way.

In another example, the parameters used in the frame interval calculator 9012 may further include a length of a dashed line and a distance between two dashes of the dashed lines.

The image mapping module 901 in FIG. 9 then fetches at least N images from the plurality of images according to the frame interval. An image composer module 9014 finally synthesizes the at least N images into a lane image by means of a max filter.

The image processing module 902 includes a ROI cropping and scaling module 9021, a contrast enhancement module 9022, an edge extraction module 9023 and a noise reduction module 9024. The image processing module 902 is configured to perform at least a procedure selected from a group consisting of regions of interest (ROI) cropping and scaling implemented by the ROI cropping and scaling module 9021, a contrast enhancement implemented by the contrast enhancement module 9022, an edge extraction implemented by the edge extraction module 9023, a noise reduction implemented by the noise reduction module 9024 and a combination thereof for producing the lane image.

For example, the ROI cropping and scaling module 9021 can change the image shape while scaling maintains the morphology of the object in the image and does not change the image pixels in any way. The contrast enhancement module 9022 changes the image value distribution to cover a wide range for the ease of human vision. An edge extraction technique is to extract the skeleton of the object in the image, such as the lines of the lane.

The prompting module 903 includes a line detection module 9031, a lane determinant module 9032 and a lane departure determinant module 9033. The prompting module 903 is configured to perform: a line detection to generate a set of candidate lines implemented by the line detection module 9031; a lane determinant based on a characteristic of each of the candidate lines to identify two lane lines of the lane, such as the distribution of the lines in the image implemented by the lane determinant module 9032.

The prompting module 903 can further take a lane departure determinant based on a reference line of the vehicle and the two lane lines implemented by the lane departure determinant module 9033.

The message generation module 904 can pop up a warning message when the vehicle deviates from one of the reference line and the lane.

The image mapping module 901, the image processing module 902 and the prompting module 903 can be implemented by an embedded system or another kind of electron device if necessary.

Figure 10:
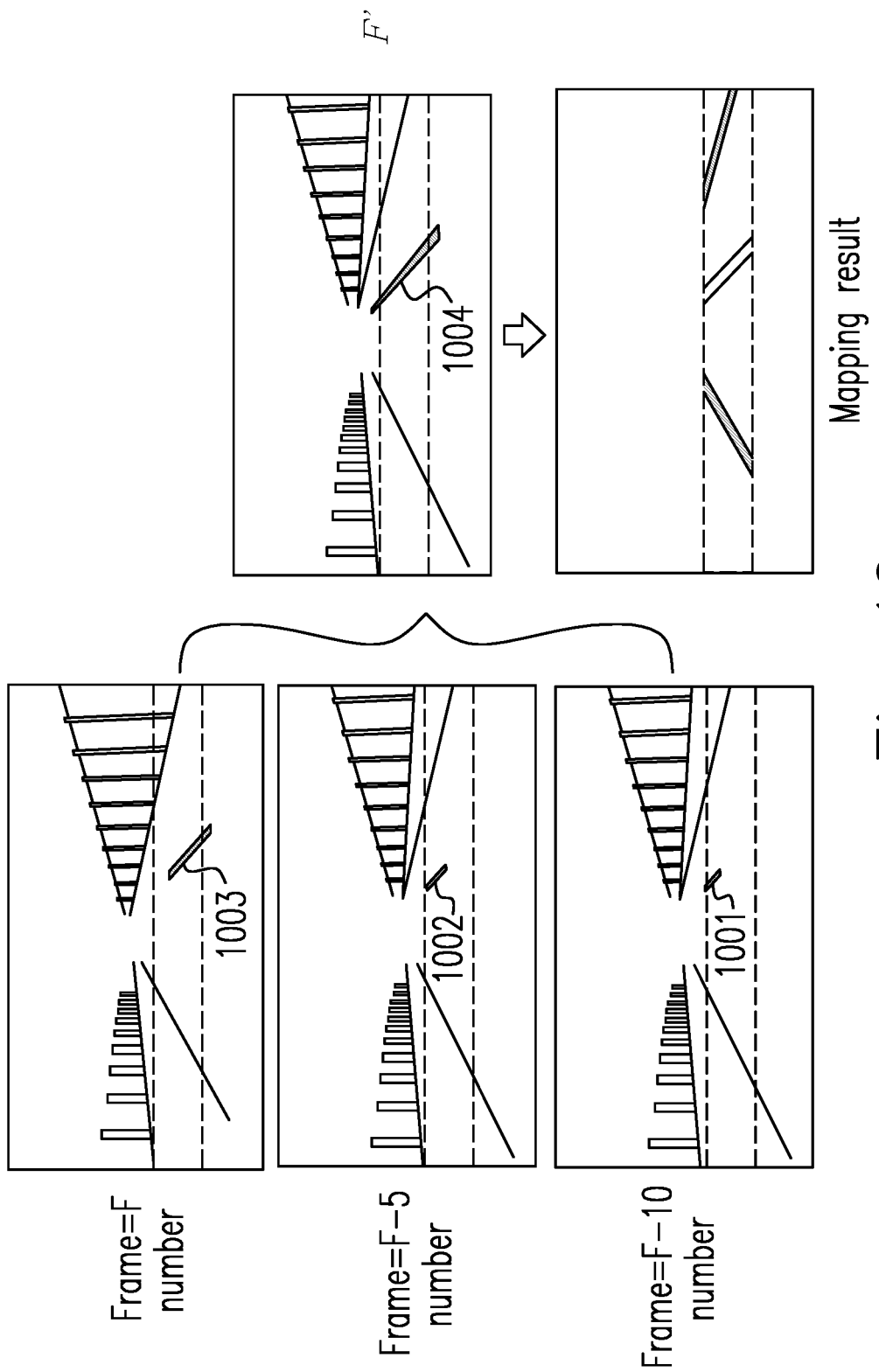
FIG. 10 illustrates a diagram of synthesizing a lane image with three gray scaled frames to form a lane image, in which the frame interval for mapping frames equals 5.

Please refer to FIG. 10, which illustrates a diagram of synthesizing a lane image with three gray scale frames (frame number=F, F-5 and F-10) with a Max function to form a lane image F' as a mapping result, in which the frame interval for mapping frames equals 5 according to the embodiment shown in FIG. 9. As one can see that fragments of lanes 1001-1003 are composed into a lane image 1004.

The image processing module 902 and the prompting module 903 could be conducted, so that a well-defined lane image is formed.

Figure 11:
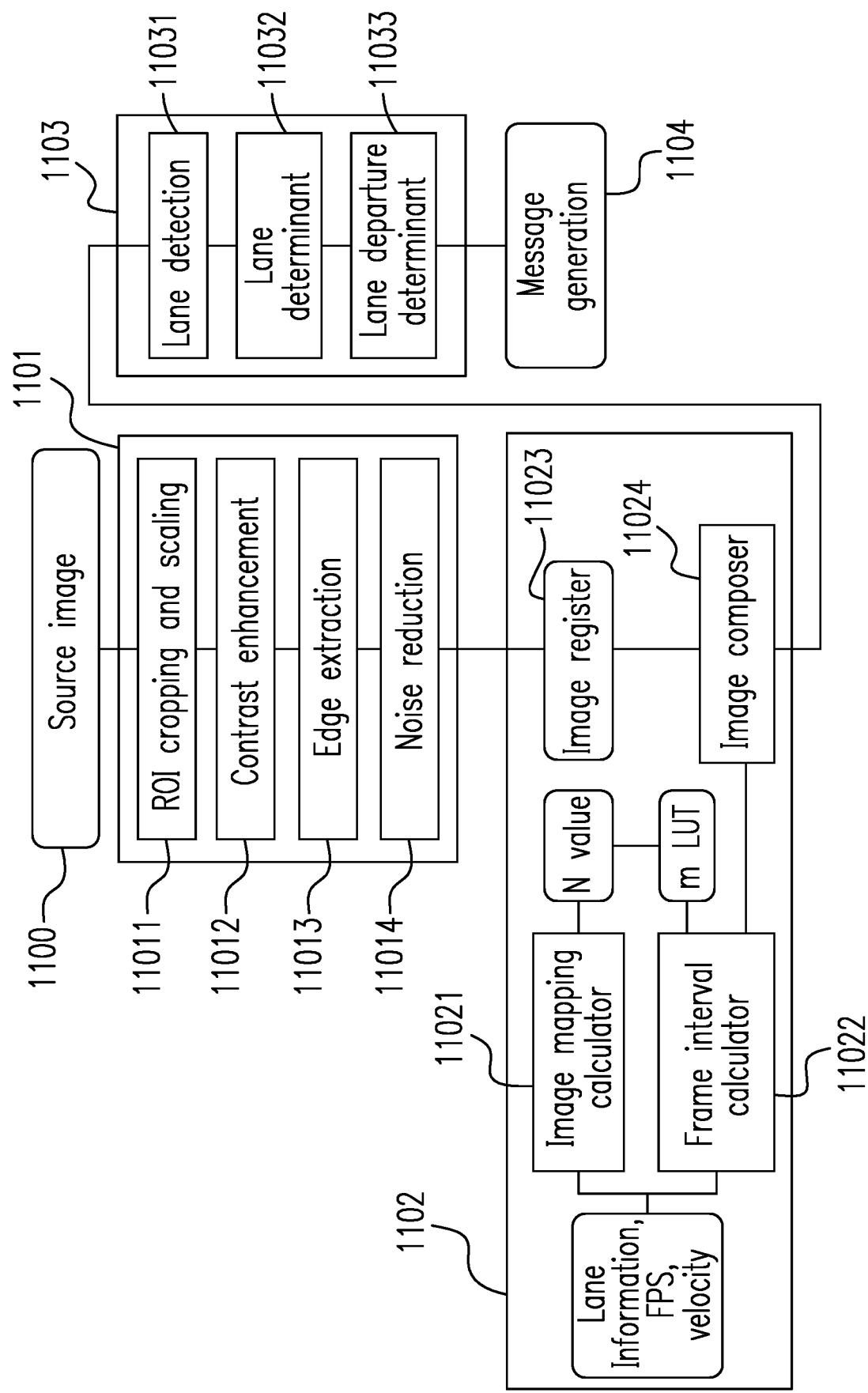
FIG. 11 illustrates a diagram of a lane image synthesizing system consisting of an image processing module, an image mapping module, and a prompting module according to the embodiments of the present invention.

Please refer to FIG. 9 and FIG. 11. FIG. 11 illustrates a diagram of a lane image synthesizing system according to the embodiments of the present invention. The lane image synthesizing system includes an image processing module 1101 taking a source image 1100 as the input, an image mapping module 1102, and a prompting module 1103 used to generate a warning message 1104. The image processing module 1101 includes a ROI cropping and scaling module 11011, a contrast enhancement module 11012, an edge extraction module 11013 and a noise reduction module 11014. The prompting module 1103 includes a lane detection module 11031, a lane determinant module 11032 and a lane departure determinant module 11033. The image processing module 1101 and the prompting module 1103 can be also implemented as the image processing module 902 and the prompting module 903 respectively. In addition, the image mapping module 1102 utilizes the output of the image processing module 1101 as the input image stored in an image register 11023.

In the image mapping module 1102, there is a process to calculate a least quantity $N_{least}$ for image mapping using an image mapping calculator 11021, and a frame interval calculator 11022 is responsible for another process for a table NLUT and a table mLUT corresponding to different velocities of a vehicle. The table NLUT includes a list of possible quantities for image mapping. The table mLUT is established according to a plurality of velocity values, a quantity N for image mapping and a plurality of intervals for mapping image, wherein the plurality of intervals are calculated based on the quantity N, a dash length L of a dashed line, a distance S between two dashes of the dashed line and the plurality of velocity values. And the at least N image frames with an interval between two continuous frames at the time scale are used to obtain a lane image using an image composer 11024. These two processes can be conducted only once and calculated in advance, thus it can increase the efficiency of the present invention.

Figure 12C:
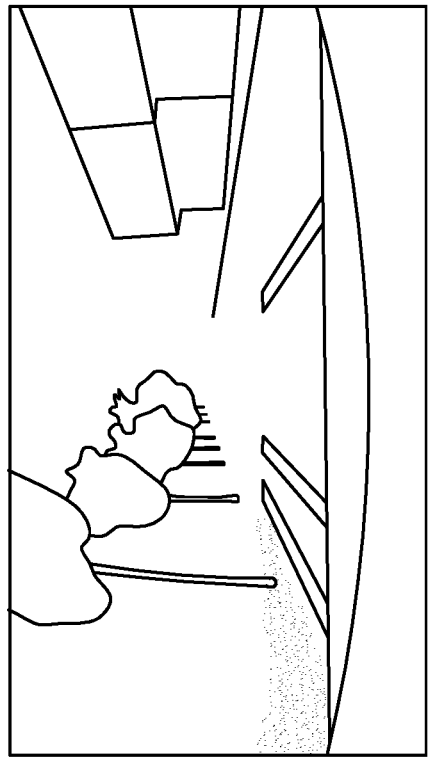
FIGS. 12(A)-12(C) illustrate the conditions of 50 kilometers/hour as a velocity of a vehicle and the frame interval for mapping frames equals 7 on the street in the daytime as the scenario of one embodiments of the present invention.
Figure 12B:
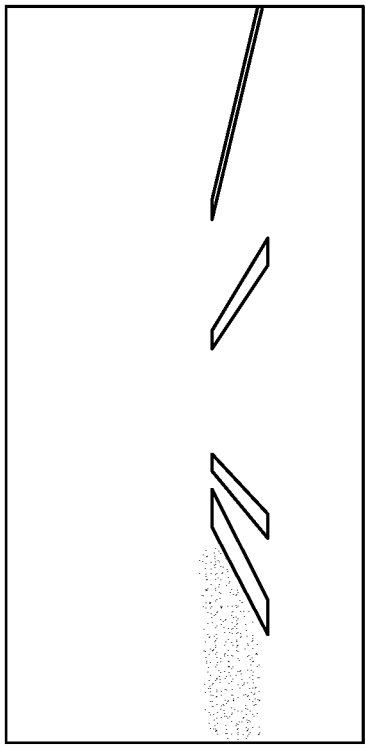
Figure 12A:
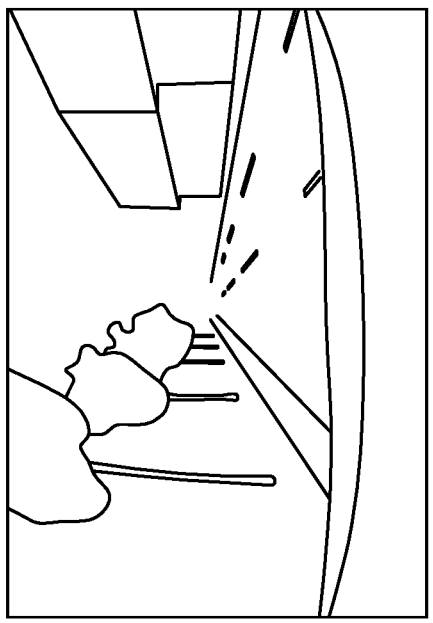

Please refer to FIGS. 12(A)-12(C), which illustrate the conditions of 50 kilometers/hour as a velocity of a vehicle, and the frame interval for mapping frames equals 7 on the street in the daytime as the scenario of one embodiments of the present invention.

FIG. 12(A) illustrates the scene of on the street in the daytime. FIG. 12(B) renders the lane image after using an image synthesizing device. FIG. 12(C) is the result of a superimposed image combining FIG. 12(A) and FIG. 12(B) to evaluate the accuracy of the image synthesizing device by naked eyes.

Figure 13A:
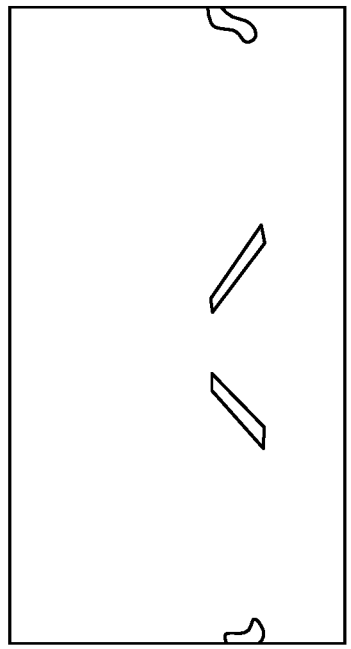
FIGS. 13(A)-13(C) illustrate the conditions of 56 kilometer/hour as a velocity of a vehicle and the frame interval for mapping frames equals 6 on a curve of the street at night as the scenario of one embodiments of the present invention.
Figure 13B:
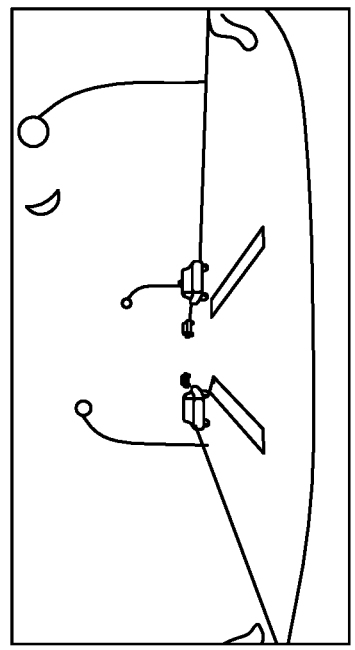
Figure 13C:
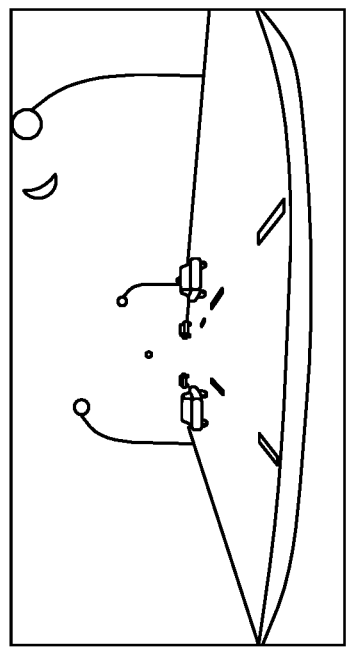

Please refer to FIGS. 13(A)-13(C), which illustrate the conditions of 56 kilometers/hour as a velocity of a vehicle and the frame interval for mapping frames equals 6 on the curve of the street at night as the scenario of one embodiments of the present invention.

FIG. 13(A) illustrates the scene of the curve of the street at night. FIG. 13(B) renders the lane image after using an image synthesizing device. While FIG. 13(C) is the result of a super-imposed image combining FIG. 13(A) and FIG. 13(B) to evaluate the accuracy of the image synthesizing device by naked eyes.

In short, the present invention is related to a process of connecting dashed lines with a number of image frames separated by a frame interval. Thus dashed lane lines can be connected, followed by a lane detection, especially when it deals with the problem of dashed lines.

In order to effectively detect the dashed lines, the following information about a velocity of a vehicle, a quantity for image mapping and a frame interval for mapping image frames is needed. In contrast to the prior art, this invention can be applied in a driving record, applicable to images configured to the front part of the vehicle. It is simple and more reliable without complex algorithms, and it will not require a substantial amount of system memory.

What is claimed is:

1. An image synthesizing system of a vehicle driven on a road having a dashed line having a plurality of dashes and a plurality of spaces, each of which is located between every adjacent two dashes, the image synthesizing system comprising:
    a video image capture device obtaining a plurality of image frames having a plurality of fractional images of the dashes at a frame rate f; and
    an image mapping module configured to obtain the frame rate f from the video image capture device and a real-time velocity of the vehicle v, and including:
        an image register configured to store the plurality of image frames;
        an image mapping calculator determining a quantity N for an image mapping based on a dash length L and a distance S between two dashes of the dashed line;
        a frame interval calculator determining a frame interval m based on the real-time velocity v, the dash length L, the distance S and the frame rate f; and
        an image composer fetching at least N image frames from the plurality of image frames according to the frame interval m, and synthesizing the at least N image frames to obtain a virtual solid line based on fractional images of the dashes in the fetched at least N image frames.

2. The image synthesizing system as claimed in claim 1, wherein the quantity N is determined based on a ratio of the dash length L to the distance S.

3. The image synthesizing system as claimed in claim 1, wherein the quantity N is determined based on the formula: N≥ceil(S/L)+1.

4. The image synthesizing system as claimed in claim 1, wherein the frame interval m has a value ranging between ceil((f/v) (S/(N−1))) and floor((f/v)L).

5. The image synthesizing system as claimed in claim 1, wherein the quantity N and the frame interval m are determined by looking up tables.

6. The image synthesizing system as claimed in claim 1, wherein the virtual solid line is in a lane image, and the image synthesizing system further comprising an image processing module connected to the image mapping module, and including:
 a region of interest (ROI) cropping and scaling module changing a shape of the lane image while maintaining a morphology of objects in the lane image;
 a contrast enhancement module changing an image value distribution of the lane image to cover a wider range;
 an edge extraction module extracting the fractional images of the dashes in the fetched at least N image frames.

7. The image synthesizing system as claimed in claim 6, wherein the image processing module further includes a noise reduction module.

8. The image synthesizing system as claimed in claim 6, further comprising a prompting module connected to the image processing module, and including:
 a lane detection module generating a set of candidate lines including the virtual solid line;
 a lane determinant module identifying two lines of a lane based on a characteristic of each of the set of candidate lines; and
 a lane departure determinant module determining whether the vehicle is departing from the lane based on the two lines of the lane and a reference line of the vehicle.

9. The image synthesizing system as claimed in claim 1, wherein a union of the at least N image frames is taken to form the virtual solid line if each of the image frames is a binary image.

10. The image synthesizing system as claimed in claim 1, wherein one of a Max function and an addition algorithm for the at least N image frames is taken to form the virtual solid line if each of the image frames is one of a gray scale image and a color image.

11. A method for real-time image synthesis from a video image capture device built on a vehicle driven on a road having a dashed line having a plurality of dashes and a plurality of spaces, each of which is located between every adjacent two dashes, the method comprising steps of:
 (a) obtaining a plurality of image frames having a plurality of fractional images of the dashes at a frame rate f by means of the video image capture device;
 (b) storing the plurality of images into an image register;
 (c) determining a quantity N for an image mapping based on a dash length L and a distance S between two dashes of the dashed line;
 (d) determining a frame interval m based on a real-time velocity v of the vehicle, the dash length L, the distance S and the frame rate f;
 (e) fetching at least N image frames from the plurality of image frames in the image register according to the frame interval m; and
 (f) synthesizing fractional images in the fetched at least N image frames to obtain a virtual solid line.

12. The method as claimed in claim 11, wherein in step (c), the quantity N is determined based on a ratio of the dash length L to the distance S.

13. The method as claimed in claim 11, wherein in step (c), the quantity N is determined based on the formula: N≥ceil(S/L)+1.

14. The method as claimed in claim 11, wherein in step (d), the frame interval m has a value ranging between ceil((f/v) (S/(N−1))) and floor((f/v)L).

15. The method as claimed in claim 11, wherein the quantity N and the frame interval m are determined by looking up tables.

16. The method as claimed in claim 11, wherein a union of the at least N image frames is taken to form the virtual solid line if each of the image frames is a binary image.

17. The method as claimed in claim 11, and one of a Max function and an addition algorithm for the at least N image frames is taken to form the virtual solid line if each of the image frames is one of a gray scale image and a color image.

18. The method as claimed in claim 11, wherein the virtual solid line is in a lane image, and the method further comprising substeps of:
 (f1) changing a shape of the lane image while maintaining a morphology of objects in the lane image; and
 (f2) changing an image value distribution of the lane image to cover a wider range.

19. The method as claimed in claim 11, further comprising steps of:
 (g) generating a set of candidate lines including at least the virtual solid line; and
 (h) identifying two lines of a lane based on a characteristic of each of the set of candidate lines.

20. The method as claimed in claim 19, further comprising a step of:
 (i) determining whether the vehicle is departing from the lane based on the two lines of the lane and a reference line of the vehicle.

* * * * *

UNITED STATES PATENT AND TRADEMARK OFFICE
CERTIFICATE OF CORRECTION

| | | |
|---|---|---|
| PATENT NO. | : 10,970,567 B2 | Page 1 of 1 |
| APPLICATION NO. | : 16/560861 | |
| DATED | : April 6, 2021 | |
| INVENTOR(S) | : Chih-Chang Shih | |

It is certified that error appears in the above-identified patent and that said Letters Patent is hereby corrected as shown below:

On the Title Page

Item (73), please change Assignee name from "Catch Technology, Inc., Hsinchu (TW)" to --iCatch Technology, Inc., Hsinchu (TW)--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*